United States Patent [19]

Battle et al.

[11] Patent Number: 5,864,704
[45] Date of Patent: Jan. 26, 1999

[54] MULTIMEDIA PROCESSOR USING VARIABLE LENGTH INSTRUCTIONS WITH OPCODE SPECIFICATION OF SOURCE OPERAND AS RESULT OF PRIOR INSTRUCTION

[75] Inventors: James Thomas Battle, Mountain View; Andy C. Hung, Los Altos Hills; Stephen C. Purcell, Mountain View, all of Calif.

[73] Assignee: Chromatic Research, Inc., Sunnyvale, Calif.

[21] Appl. No.: 541,565

[22] Filed: Oct. 10, 1995

[51] Int. Cl.$^6$ ....................................................... G06F 9/34
[52] U.S. Cl. ...................... 395/800.24; 395/386; 395/391
[58] Field of Search ..................................... 395/382, 386, 395/388, 391, 800.24

[56] References Cited

U.S. PATENT DOCUMENTS

| | | | |
|---|---|---|---|
| 4,807,113 | 2/1989 | Matsumoto et al. | 395/386 |
| 4,896,258 | 1/1990 | Yamaguchi et al. | 395/388 |
| 5,301,285 | 4/1994 | Hanawa et al. | 395/388 |
| 5,371,864 | 12/1994 | Chuang | 395/386 |
| 5,408,625 | 4/1995 | Narita et al. | 395/386 |
| 5,442,762 | 8/1995 | Kato et al. | 395/391 |

*Primary Examiner*—Richard L. Ellis
*Attorney, Agent, or Firm*—Skjerven, Morrill, Macpherson, Franklin & Friel LLP; Edward C. Kwok

[57] ABSTRACT

A media engine is disclosed herein which incorporates into a single chip structure the seven multimedia functions of video, 2D graphics, 3D graphics, audio, FAX/modem, telephony, and video-conferencing. In accordance with the present invention, a media engine includes a signal processor which shares a memory with the CPU of the host computer and also includes a plurality of control modules each dedicated to one of the seven multi-media functions. The signal processor retrieves from this shared memory instructions placed therein by the host CPU and in response thereto causes the execution of such instructions via one of the on-chip control modules. The signal processor utilizes an instruction register having a movable partition which allows larger than typical instructions to be paired with smaller than typical instructions. The signal processor reduces demand for memory read ports by placing data into the instruction register where it may be directly routed to the arithmetic logic units for execution and, where the destination of a first instruction matches the source of a second instruction, by defaulting the source specifier of the second instruction to the result register of the ALU employed in the execution of the first instruction.

10 Claims, 4 Drawing Sheets

MULTIMEDIA PROCESSOR USING VARIABLE LENGTH INSTRUCTIONS WITH OPCODE SPECIFICATION OF SOURCE OPERAND AS RESULT OF PRIOR INSTRUCTION

BACKGROUND

The rapidly growing market for personal computers is currently undergoing a revolution driven in part by multimedia computing demands. Conventional personal computers, however, have only rudimentary multimedia capabilities. Multimedia functions such as video-conferencing and FAX/modem are usually implemented in separate add-in cards which are then coupled to the personal computer's external ports. Simply adding multimedia functions to a conventional personal computer in such a piecemeal fashion is largely ineffective and results in an embryonic implementation of such functions. Further, conventional processors employed in personal computers are not designed to incorporate a large variety of multimedia functions and, accordingly, have severe limitations upon the quality and speed with which the various multimedia functions may be implemented.

Thus, there is a need for a single-chip multimedia engine that incorporates the seven multimedia functions, e.g., video, 2D graphics, 3D graphics, audio, FAX/modem, telephony, and video-conferencing and, as such, effectively addresses the needs of the home personal computer market as well as the retail multimedia upgrade market.

SUMMARY

A media engine is disclosed herein which incorporates into a single chip structure the seven multimedia functions of video, 2D graphics, 3D graphics, audio, FAX/modem, telephony, and video-conferencing. In accordance with the present invention, a media engine includes a signal processor which shares its memory with the CPU of the host computer and also includes a plurality of off-chip control modules for implementing the seven multi-media functions mentioned above. The signal processor retrieves from its shared memory instructions placed therein by the host CPU and in response thereto causes the execution of such instructions via one of the on-chip control modules.

In one embodiment, the signal processor utilizes an instruction-pair register having a movable partition which allows larger than typical instructions to be paired with smaller than typical instructions.

Further, the signal processor reduces demand for memory read ports in one of several ways. First, the signal processor may place data into the instruction register where it may be directly routed to the arithmetic logic units for execution. Second, the instruction identifies when the source of a second instruction matches the destination of a first instruction and, when appropriate, defaults the source specifier of the second instruction to the result register of the ALU employed in the execution of the first instruction. In this manner, the memory read ports may be entirely by-passed.

DETAILED DESCRIPTION

Figure 1:
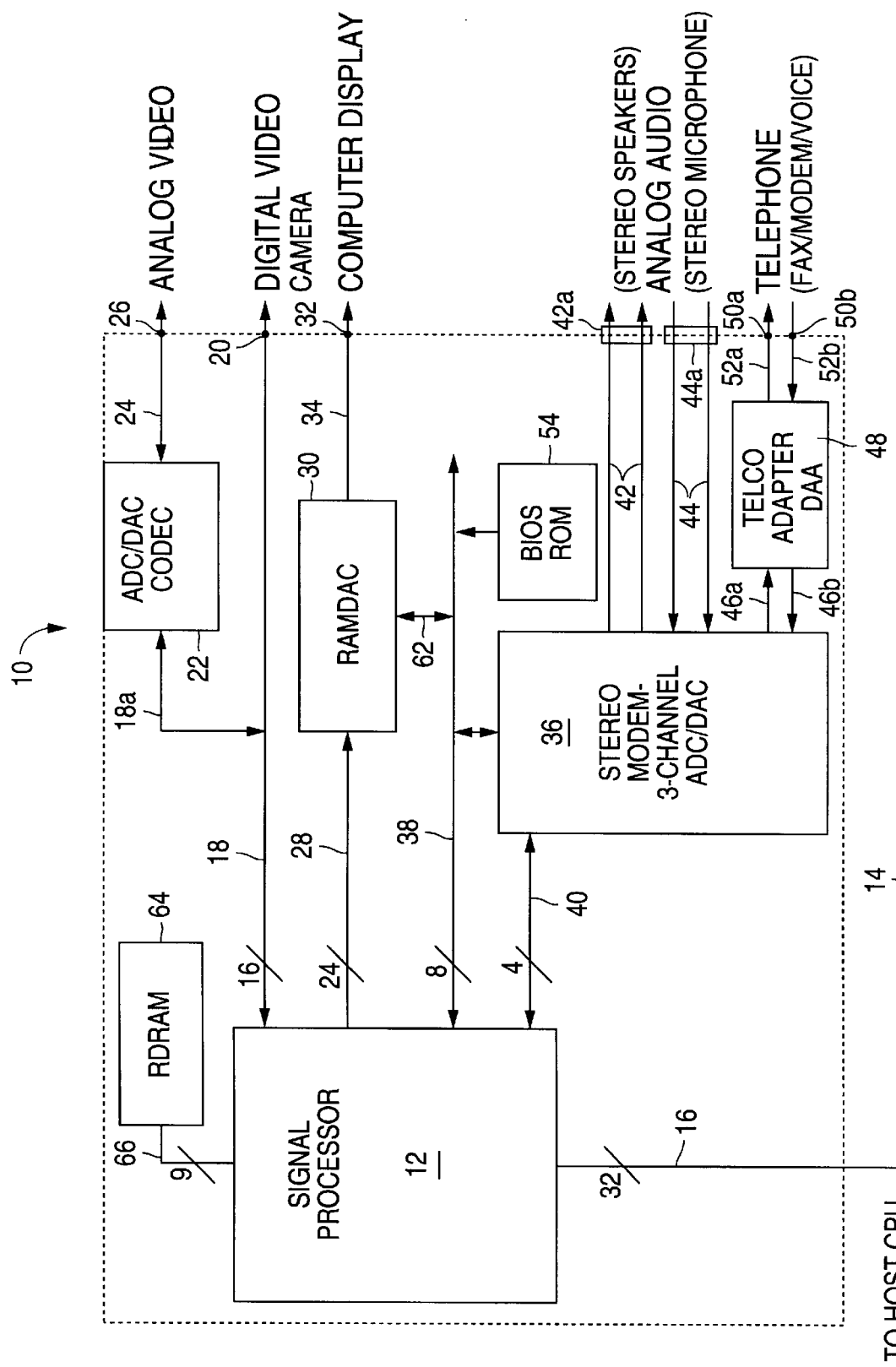
FIG. 1 is a block diagram of a media engine in accordance with the present invention.

FIG. 1 is a block diagram of the media engine in accordance with the present invention. Engine 10 includes a signal processor (SP) 12 coupled to a PCI bus 14 of the host personal computer (not shown), and thus to the CPU (not shown) of the host computer, via a 32-bit bus 16. A 16-bit bi-directional video bus 18 couples signal processor 12 to a video port 20 to which video equipment such as a conventional digital video camera may be attached. Video bus 18 is also coupled to an analog-to-digital/digital-to-analog converter (ADC/DAC) 22 having therein a CODEC via bus 18a. ADC/DAC-codec 22 is a conventional device available from Philips. A bi-directional bus 24 connects ADC/DAC-codec 22 to an output port 26 to which analog video equipment such as conventional video cameras, VCRs, or televisions may be attached.

Signal processor 12 is coupled to a conventional RAM-DAC 30 via a 24-bit display bus 28. RAMDAC 30 is, in turn, coupled via a bus 34 to an output port 32 to which a display equipment such as a computer display may be attached.

A chip 36 including stereo audio circuitry, a modem, and a 3-channel ADC/DAC is coupled to signal processor 12 via an 8-bit peripheral bus 38. Note that in some embodiments a 4-bit dedicated bus 40 may link chip 36 to signal processor 12. Chip 36, which is of conventional design and is available from Analog Devices, is coupled to output ports 42a and 44a via unidirectional buses 42 and 44, respectively. Stereo speakers may be attached to port 42a and a stereo microphone may be attached to port 44a. Together, ports 42a and 44a provide analog audio functionality to engine 10. Chip 36 is also coupled via buses 46a and 46b to a conventional Telco Adapter 48 which, in turn, is coupled is coupled to output ports 50a and 50b via buses 52a and 52b, respectively. A telephone, voice system, and/or a FAX/modem may be attached to ports 50a and 50b.

Peripheral bus 38 is also coupled to a BIOS ROM 54. RAMDAC 30 receives control signals from peripheral bus 38 via control bus 62. An RDRAM 64 is coupled to signal processor 12 via an 9-bit bus 66.

Figure 2:
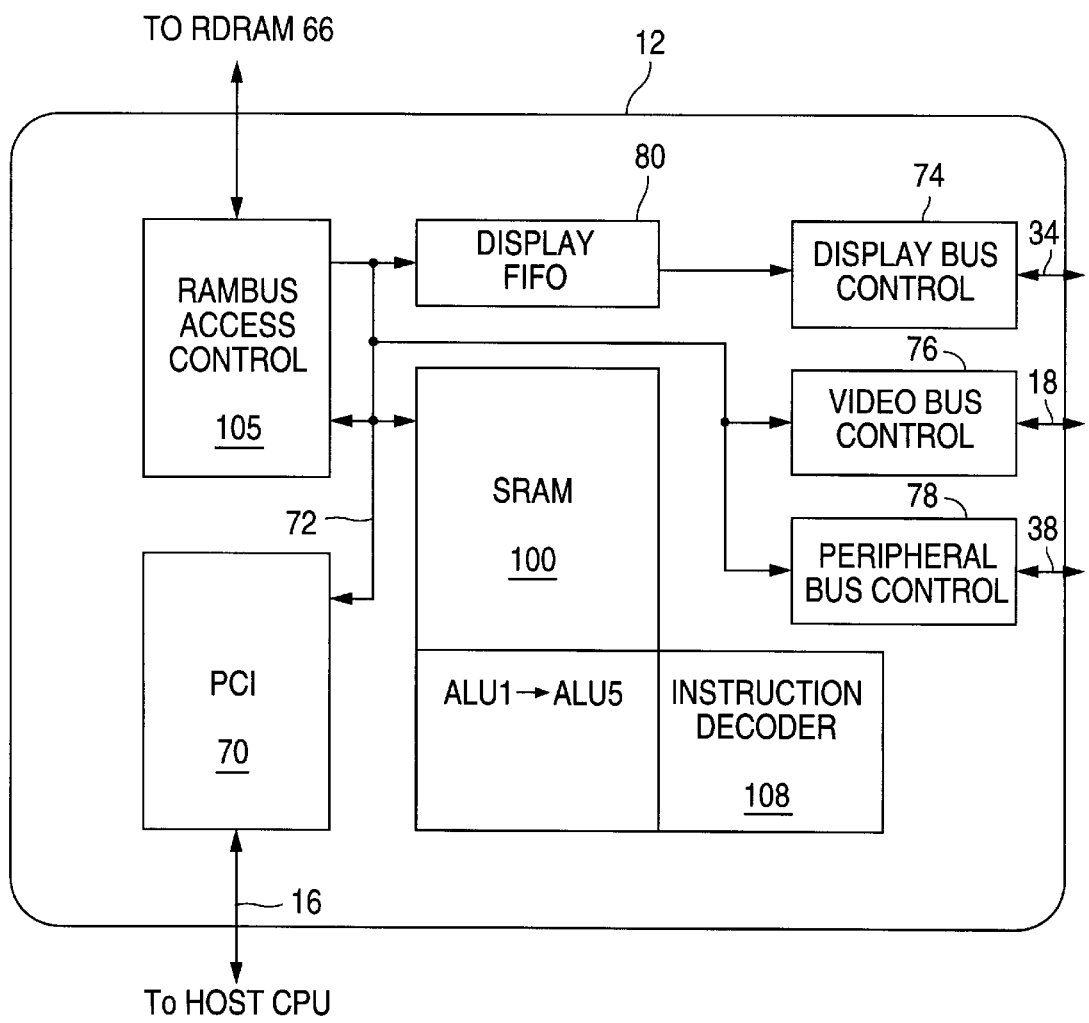
FIGS. 2 and 3 are block diagrams illustrating the topology of a signal processor employed in the media engine of FIG. 1 in accordance with the present invention.

Referring to FIG. 2, signal processor 12 includes a PCI interface module for providing signals received from the host CPU via bus 16 onto internal memory bus 72. A display bus control module 74, a video bus control module 76, and a peripheral bus control module 78 provide control and routing information for display bus 34, video bus 18, and peripheral bus 38, respectively. A display FIFO 80 acts as a buffer for display bus control module 74. Note that Rambus access control module 105, PCI interface 70, display FIFO 80, video bus control module 76, peripheral bus control module 78, as well as SRAM 100, ALU1–ALU5, and instruction decoder 108, are all coupled to memory bus 72.

Figure 3:
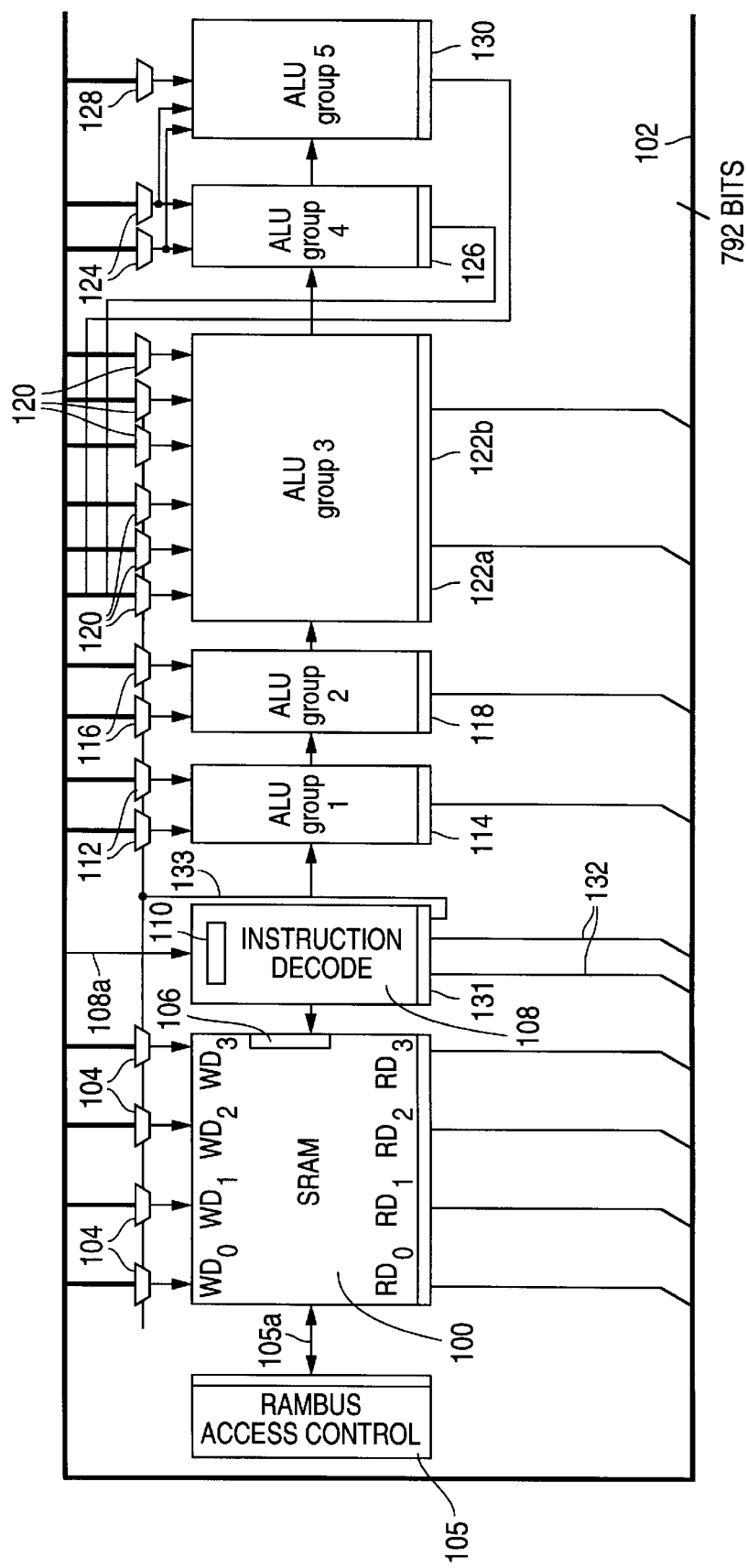
Figure 4:
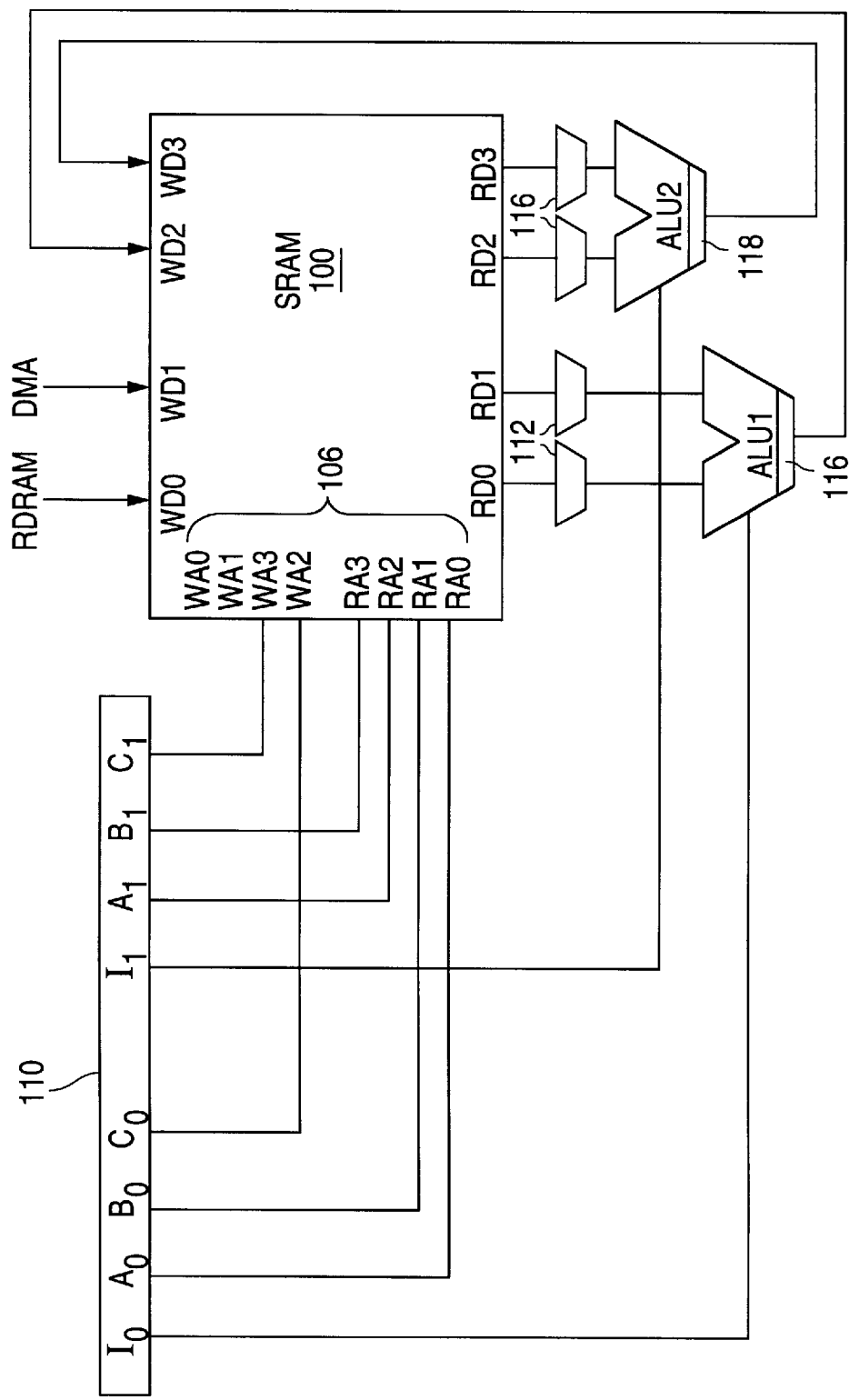
FIG. 4 is block diagram illustrating the format of the instruction register used in the signal processor of FIG. 2 in accordance with the present invention.

Refer also to FIGS. 3 and 4, which show a block diagram of signal processor 12 and illustrate signal flow with signal processor 12, respectively. Note that in FIG. 4 all buses, unless otherwise specified, are 8 bytes wide. Signal processor 12 includes an SRAM 100 having 4 read data ports RD0, RD1, RD2, and RD3 coupled directly to a 792-bit global bus 102 and four write data ports WD0, WD1, WD2, and WD3 coupled to global bus 102 via multiplexers (MUXs) 104, respectively. A RAMbus Access Control (RAC) 105 is coupled to SRAM 100 via bi-directional bus 105a. SRAM 100 also includes a bank 106 of four read address ports RA0, RA1, RA2, and RA3 and four write address ports WA0, WA1, WA2, and WA3 coupled to an instruction decoder 108 having an instruction register 110 included therein. Instruction decoder 108 is directly coupled to global bus 102 via bus 108a.

Signal processor 12 further includes five arithmetic logic units (ALUs). The first, ALU1, has two input ports coupled to global bus 102 via multiplexers 112 and has an output result register 114 directly coupled to global bus 102. ALU1 is primarily used for shifting. ALU2, which is capable of performing two-input addition, has two input ports coupled to global bus 102 via multiplexers 116 and has an output result register 118 directly coupled to global bus 102. ALU3 has six input ports coupled to global bus 102 via multiplexers 120 and two output registers 122a and 122b directly coupled to global bus 102 and, as such, performs three-input arithmetic and completes multiplication operations. ALU4 has two input ports coupled to global bus 102 via multiplexers 124 and an output register 126 directly coupled to global bus 102. ALU4 performs the first half (one cycle) of multiplication operations. ALU5 has one input port coupled to global bus 102 via multiplexer 128, two input ports coupled to the outputs of MUXs 124, respectively, and an output register 130 directly coupled to global bus 102. ALU5 is used for motion estimation. The respective control ports of the above mentioned ALUs are coupled to an output register 131 of instruction decoder 108 via bus 133. Note also that the MUXs 104 controlling access to write data ports WD0–WD3 each have a control terminal coupled to instruction decoder 108 via bus 133.

The operation of media engine 10 is, referring to FIGS. 1, 2, and 3, as follows. The CPU of the host computer (not shown) puts an instruction in DRAM 64 where it is then loaded into SRAM 100 of signal processor 12 (SRAM 100 serves as a cache for the DRAM 64 which is shared by the host system). The encoded instruction is temporarily stored in instruction register 110 of instruction decoder 108. Instruction decoder 108 decodes the encoded instructions in instruction register 110 and, in response thereto, causes the operations identified by the instructions to be executed by providing appropriate control signals to the respective ALUs and SRAM.

FIG. 4 shows a simple instruction pair (instruction 0, instruction 1) in instruction register 110. Instruction register 110 is an 8-byte register containing two typical 4-byte instructions, where the first instruction includes a 1-byte opcode $I_0$ and three 1-byte specifiers $A_0$, $B_0$, and $C_0$, and the second instruction includes a 1-byte opcode $I_1$ and three 1-byte specifiers $A_1$, $B_1$, and $C_1$. Each byte has 9-bits. In the example of FIG. 4, read data ports RD0 and RD1 are shown coupled to the two input ports of ALU1 and read data ports RD2 and RD3 are shown coupled to the two input ports of ALU2 by way of example only. In actual embodiments, each of read data ports RD0–RD3 is coupled to the input ports of all five ALUS, e.g., ALU1, ALU2, ALU3, ALU4, and ALU5, via global bus 102. In a similar manner, FIG. 4 shows the opcodes $I_0$ and $I_1$ of instruction register 110 being coupled as control signals to ALU1 and ALU2, respectively, for simplicity. In actual embodiments, opcodes $I_0$ and $I_1$ stored in instruction register 110 may be directly routed to any of the five ALUs.

Recall that SRAM 100 has four read address ports RA0–RA3, and instruction register 110 is eight bytes wide. Thus, since for any given instruction pair stored in instruction register 110 there may be as many as seven requests (e.g., $A_0$ $B_0$, $C_0$, $A_1$, $B_1$, $C_1$, and the next instruction) for access to the four read address ports RA0–RA3 of SRAM 100, any instruction pair which collectively requires more than 4 read address ports RA0–RA3 will take more than one cycle to execute, thereby degrading performance. Further, since instruction register 110 is 8 bytes wide, operations which require an instruction having more than 4 bytes cannot be paired with the typical 4-byte wide instruction $I_0A_0B_0C_0$ and, therefore, result in a decrease in instruction execution rate. The architecture of engine 10 allows for an increased instruction execution rate by reducing the demand on read ports for source addresses and reducing the number of bytes used in the instruction register for destination addresses.

Signal processor 12 reduces demand upon read ports RD0–RD3 in several ways. Consider, for example, the normal (i.e., conventional) mode of direct addressing, where the source of each argument and the destination of the result are identified by unique specifiers in instruction register 110. That is, where it is desired to add X and Y together and write the sum in Z, e.g., Z=X+Y, specifiers $A_0$ and $B_0$ of instruction register 110 would identify the source address of data X and Y, respectively, while $C_0$ would identify the result destination, e.g., the address of Z. Such a normal operation involving three arguments X,Y,Z thus requires 4 bytes ($I_0$, $A_0$, $B_0$, $C_0$) of instruction register 110. This example may be illustrated with reference to FIG. 4, where specifiers $A_0$ and $B_0$ are provided to read address ports RA0 and RA1, respectively, of SRAM 100. In response thereto, SRAM 100 provides data signals X and Y to ALU1 which, in response to opcode $I_0$ received therein, adds X and Y and writes the sum Z to write data port WD2 of SRAM 100 where it is stored in a location indicated by $C_0$ provided to write address port WA2. Accordingly, pairs of operations such as the above described 4-byte operation Z=X+Y may be grouped together in a single instruction register 110 and, thus, potentially executed in a single cycle.

It follows, then, that an operation which writes the sum of three arguments to fourth location, i.e., Z=W+X+Y, would require 5 bytes of instruction register 110, thereby precluding being paired with a 4-byte instruction such as Z=X+Y. In such a case, the 8-byte width of instruction register 110 can accommodate only one instruction, thereby forcing one of the pair to be executed in a subsequent cycle and, as a result, decreasing the instruction execution rate.

In those instructions in which the destination matches one of the sources, i.e., X=X+Y, no destination specifier need be provided in instruction register 110. The absence of a destination specifier is detected and by default the result of the operation will be written to the memory location identified by $A_0$, i.e., to X. This instruction mode, hereinafter referred to as equals mode, thus results in a 3-byte instruction which, as will be described below, may be paired with a 5-byte instruction in instruction register 110, thereby potentially allowing for both the 3-byte and the 5-byte instructions to be executed in a single cycle.

Applicants have further realized that sometimes the destination of one instruction matches a source of the following instruction. In those cases where the result of the first instruction operation is needed only for the next instruction operation, and can thus be otherwise discarded, signal processor 12 operates in a "forward" mode. In forward mode, a destination specifier is not provided in the instruction. Rather, the result of the operation is simply "left" in the result register of the associated ALU. For example, the forward mode instruction for the addition of A and B, which may be expressed as @1=X+Y (where @1 denotes result register 110 of ALU1), requires only a three byte instruction, i.e., $I_0$, $A_0$, and $B_0$. Thus, by saving one byte in instruction register 110, the above described forward mode instruction may, in a manner similar to that described above with respect to equals mode, be paired with a 5-byte instruction. As mentioned above and will be described below, the ability to pair a 5-byte instruction with another instruction results in an increased instruction execution rate.

In the above example, where the destination of first instruction matches a source of the second instruction, a read port may be saved during execution of the second instruction regardless of whether forward mode instruction was utilized in the first instruction. That is, the source specifier of the second instruction which matches the destination of the first instruction may identify the result register of the ALU employed by the first instruction rather than identifying a memory location in SRAM 100. For example, where instruction 0 calls for ALU1 to execute X=W+V and instruction 2 calls for Z=X+Y, the source specifier $A_2$ of instruction 2 identifies the address of result register 114 of ALU2 and, thus, eliminates the need for accessing of read ports of SRAM 100. Further, addressing result registers of the ALUs in such a manner also ensures that the value of X is updated according to the result of instruction 0 before it is used in the execution of instruction 2. since SRAM 100 may not be fast enough to write the updated value of X before being retrieved for execution of the next instruction, forward addressing ensures that the most recently value of an argument is provided for execution.

Saving a read port as described above is important in achieving a faster instruction execution time. As mentioned earlier, in any given instruction pair there are potentially seven items to be read out of SRAM 100. Since, however, only four items may be read out of the four read data ports RD0–RD3 of SRAM 100 per cycle, any instruction pair which requires reading more than four items out of SRAM 100 will take more than one cycle to execute.

Signal processor 12 is able to save additional read ports RD0–RD3 at the source end of the execution of instructions by utilizing "immediate" addressing. In immediate addressing, one or more of the source specifiers e.g. $A_0$ may represent the argument data itself rather than the address of the argument. Immediate addressing can be performed in normal, equals, and forward instruction modes. For example, in performing a normal immediate addressing operation, which may be expressed as $Z=X+Y_i$, specifiers $A_0$ and $C_0$ identify the addresses of X and Z, while specifier $B_0$ would be the data Y. In such a case, instruction decoder 108 routes specifier $B_0$ as data directly to the ALU specified in the opcode via one of buses 132 (FIG. 3). Thus, since in immediate addressing one or more of the specifiers within instruction register 110 are sent directly to one of the ALUs as data, one or more read ports RD0–RD3 may be saved per instruction pair.

The control information for executing an instruction pair is contained in the opcodes extracted from instruction register 110, where opcodes $I_0$ and $I_1$ are of the form F0101ZZOM and F1010ZZOM, respectively. The addressing mode selection is determined by bit positions 8-5 of each opcode, where "0101" (and thus opcode $I_0$) indicates direct addressing and "1010" (and thus opcode $I_1$) indicates immediate addressing. The instruction mode selection for an instruction is determined by the M bit of the opcode of that instruction, where a "0" indicates normal mode instruction and a "1" indicates a scalar mode instruction. Note that if in normal mode (M="0") an instruction is paired with a 5-byte instruction, equals mode is inferred. In a similar manner, if M="1" and an instruction is paired with a 5-byte instruction, forward mode is inferred. The flag bits F of the two opcodes within instruction register 108, i.e., $F_0$ and $F_1$ of opcodes $I_0$ and $I_1$, respectively, together determine whether the associated instruction pair is to be executed sequentially or concurrently according to the following table:

| $F_nF_{n-1}$ | Mode |
|---|---|
| "00": | sequential scalar |
| "01": | concurrent scalar |
| "10": | concurrent vector count0 |
| "11": | concurrent vector count1 |

Sequential scalar mode execution, which indicates that the instruction pair will be executed sequentially, is used, for example, when both instructions of a pair call for the use of ALU1 or when the instruction pair collectively requires more than four read ports RD0–RD3 of SRAM 100, while in concurrent scalar mode instruction decoder 108 causes the instruction pair to executed simultaneously, as permitted by the above-discussed limitations on read port availability and instruction register byte size. Concurrent vector count0 and concurrent vector count1 mode execution indicate simultaneous execution of the instruction pair $n_0$ and $n_1$ times, respectively, where $n_0$ and $n_1$ are integers stored in memory locations count0 and count1, respectively. Note that including loop execution information in the respective F bit of each opcode of an instruction pair eliminates the need for a separate loop instruction and, therefore, results in a further increase in the effective speed of signal processor 12.

In accordance with the above-described instruction, addressing, and execution modes as identified in the opcode of each instruction, instructions of varying byte sizes may be combined instruction register 110. Accordingly, the partition of instruction register 110 which separates instructions of a pair is movable. This movable partition allows instruction register 110 to pair a 5-byte instruction and 3-byte instruction or two 4-byte instructions. Thus, unlike conventional instruction register formats which upon receiving a 5-byte instruction would automatically execute only that instruction, the ability to pair longer-than usual instructions with shorter than usual instructions allows for the simultaneous execution of both and, thus, allows engine 10 a greater processing speed.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A multimedia circuit, comprising:
    a plurality of arithmetic logic units (ALUs), each ALU having associated therewith a register to which an output datum of said ALU is stored; and
    an instruction register, said instruction register accommodating first and second instructions, each instruction specifying an op-code, one of said ALUs and an operand op-code of said first instruction specifies as said operand source of said first instruction the result register associated with the ALU specified in said second instruction.

2. The multimedia circuit of claim 1 wherein said first instruction further specifies a second operand source, said opcode of said first instruction further specifying that the output datum in the register associated with the ALU specified in said opcode of said first instruction is to be stored in one of said first and second operand sources of said first instruction.

3. The multimedia circuit of claim 1 wherein said opcodes of said first and second instructions specifies whether said first and second instructions are executed sequentially or concurrently.

4. The multimedia circuit of claim 1 wherein said opcode of said first instruction indicates a number of times said first instruction is executed.

5. The multimedia circuit of claim 1 wherein said instruction register is eight bytes wide.

6. The multimedia circuit of claim 5 wherein said first and second instructions have different lengths.

7. In a microprocessor, a method comprising the steps of:

providing a plurality of arithmetic logic units (ALUs) each capable of executing an instruction and providing a datum in a register associated with each ALU;

providing an instruction register designed for holding a plurality of said instructions, each instruction specifying an opcode, an operand source and one of said ALUs for executing said instruction;

assigning each instruction in said instruction register to a selected one of said ALUs for execution;

executing said instructions of said instruction register in their respective assigned ALUs and providing a result datum for each of said instructions and determining whether said opcode of an instruction specifies that said result datum of said instruction is to be stored in said operand source.

8. The method of claim 7, further comprising the step of determining in each instruction, based upon said opcode, whether or not said operand source specifies an immediate value, a register of an ALU, or a memory address.

9. The method of claim 7 further comprising the step of:

determining from said opcode of a first instruction in said instruction register and said opcode of a second instruction in said instruction register, whether said first and second instructions are executed sequentially or concurrently by a processor within said engine.

10. The method of claim 7 further comprising the step of executing, based upon said opcode of an instruction in said instruction register, said instruction a predetermined number of times.

\* \* \* \* \*